US009863726B2

(12) United States Patent
Maeda

(10) Patent No.: US 9,863,726 B2
(45) Date of Patent: Jan. 9, 2018

(54) COOLING MEDIUM CIRCULATING APPARATUS, AIR CONDITIONING APPARATUS FOR VEHICLE, AND METHOD FOR CONTROLLING COOLING MEDIUM CIRCULATING APPARATUS

(71) Applicant: CALSONIC KANSEI CORPORATION, Saitama-shi, Saitama (JP)

(72) Inventor: Tomohiro Maeda, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 289 days.

(21) Appl. No.: 14/761,750

(22) PCT Filed: Nov. 1, 2013

(86) PCT No.: PCT/JP2013/079767
§ 371 (c)(1),
(2) Date: Jul. 17, 2015

(87) PCT Pub. No.: WO2014/112183
PCT Pub. Date: Jul. 24, 2014

(65) Prior Publication Data
US 2015/0362268 A1 Dec. 17, 2015

(30) Foreign Application Priority Data
Jan. 18, 2013 (JP) .................. 2013-007787

(51) Int. Cl.
*F28F 27/00* (2006.01)
*F28F 27/02* (2006.01)
(Continued)

(52) U.S. Cl.
CPC ......... *F28F 27/02* (2013.01); *B60H 1/00278* (2013.01); *B60H 1/00885* (2013.01);
(Continued)

(58) Field of Classification Search
CPC . F28F 27/02; B60H 1/00278; B60H 1/00885; B60H 1/00899; B60H 1/143;
(Continued)

(56) References Cited

U.S. PATENT DOCUMENTS 2,693,939 A * 11/1954 Marchant .............. F24F 5/0046
126/620
3,137,278 A * 6/1964 Thayer .................... F22B 37/56
122/392
(Continued)

FOREIGN PATENT DOCUMENTS

JP  05-065018 A  3/1993
JP  3265611 B2  3/2002
(Continued)

*Primary Examiner* — Ljiljana Ciric
(74) *Attorney, Agent, or Firm* — Foley & Lardner LLP

(57) ABSTRACT

A cooling medium circulating apparatus includes first and second flow paths configured to circulate a cooling medium, and a flow path switchover unit for connecting or disconnecting between the first and second flow paths. A method for controlling a cooling medium circulating apparatus includes detecting temperatures of the cooling medium flowing through the flow paths. The method further includes calculating a temperature difference between temperatures of the cooling medium flowing through the first and second flow paths. In the cooling medium circulating apparatus and method, a prescribed cycle is set, and connecting and disconnecting periods are set. The connecting and disconnecting periods are periods for connecting and disconnecting, respectively, between the flow paths in the prescribed cycle. The flow path switchover unit is controlled based on the connecting and disconnecting periods. The prescribed cycle becomes shorter as the temperature difference becomes larger.

8 Claims, 7 Drawing Sheets

(51) Int. Cl.
*G05D 23/19* (2006.01)
*B60H 1/00* (2006.01)
*B60H 1/14* (2006.01)

(52) U.S. Cl.
CPC ......... *B60H 1/00899* (2013.01); *B60H 1/143* (2013.01); *G05D 23/1917* (2013.01); *B60H 2001/00307* (2013.01); *B60H 2001/00928* (2013.01)

(58) Field of Classification Search
CPC ........... B60H 2001/00307; B60H 2001/00928; G05D 23/1917
USPC ....... 165/267, 268, 269, 270, 288, 289, 290, 165/291, 292, 293, 294, 296, 297, 298, 165/299, 300
See application file for complete search history.

(56) References Cited

U.S. PATENT DOCUMENTS

| | | | | | |
|---|---|---|---|---|---|
| 3,322,938 | A | * | 5/1967 | Weiss | G05B 13/024 137/101.19 |
| 3,360,032 | A | * | 12/1967 | Sherwood | G05D 23/24 165/264 |
| 3,996,998 | A | * | 12/1976 | Garst | F24F 11/00 165/233 |
| 4,210,957 | A | * | 7/1980 | Spethmann | F24F 11/06 165/260 |
| 4,211,089 | A | * | 7/1980 | Mueller | F25B 13/00 62/126 |
| 4,341,345 | A | * | 7/1982 | Hammer | F25D 29/00 165/257 |
| 4,374,506 | A | * | 2/1983 | Whalen | F24D 17/001 122/20 B |
| 4,420,033 | A | * | 12/1983 | Franz | B60H 1/0005 165/202 |
| 4,881,375 | A | * | 11/1989 | Mattiola | F17C 5/005 417/20 |
| 4,945,942 | A | * | 8/1990 | Lund | F24D 17/0078 122/13.3 |
| 5,559,720 | A | * | 9/1996 | Tompkins | A61H 33/0095 700/282 |
| 5,964,279 | A | * | 10/1999 | Mochizuki | F28D 15/0233 165/104.33 |
| 6,779,735 | B1 | * | 8/2004 | Onstott | F24F 12/006 165/248 |
| 7,270,174 | B2 | * | 9/2007 | Chu | H05K 7/2079 165/11.1 |
| 7,875,173 | B1 | * | 1/2011 | Barnes | A61H 33/14 210/167.1 |
| 9,476,657 | B1 | * | 10/2016 | Pettis | H05K 7/208 |
| 2008/0085672 | A1 | * | 4/2008 | Creed | B60H 1/00207 454/69 |
| 2009/0078400 | A1 | * | 3/2009 | Tamura | B60H 1/00278 165/287 |
| 2009/0248204 | A1 | * | 10/2009 | Kikuchi | B60H 1/00278 700/275 |
| 2011/0139397 | A1 | * | 6/2011 | Haussmann | B60H 1/00278 165/43 |
| 2011/0214838 | A1 | * | 9/2011 | Akiyama | B60H 1/00278 165/41 |
| 2011/0277488 | A1 | * | 11/2011 | Peretz | F24F 5/0071 62/79 |
| 2012/0247137 | A1 | * | 10/2012 | Nakajo | B60H 1/00807 62/160 |
| 2013/0233532 | A1 | * | 9/2013 | Imwalle | F28F 27/02 165/287 |
| 2014/0318170 | A1 | * | 10/2014 | Katoh | F28F 9/26 62/324.5 |
| 2015/0273976 | A1 | * | 10/2015 | Enomoto | B60K 6/22 165/202 |
| 2016/0031291 | A1 | * | 2/2016 | Enomoto | B60H 1/00385 62/179 |
| 2016/0274011 | A1 | * | 9/2016 | Maeda | G01N 35/1011 |
| 2016/0339761 | A1 | * | 11/2016 | Enomoto | B60H 1/06 |

FOREIGN PATENT DOCUMENTS

JP 2010-282808 A 12/2010
JP 2012-023795 A 2/2012

* cited by examiner

COOLING MEDIUM CIRCULATING APPARATUS, AIR CONDITIONING APPARATUS FOR VEHICLE, AND METHOD FOR CONTROLLING COOLING MEDIUM CIRCULATING APPARATUS

TECHNICAL FIELD

The present invention relates to a cooling medium circulating apparatus, an air conditioning apparatus for a vehicle, and a method for controlling a cooling medium circulating apparatus.

BACKGROUND ART

An air conditioning apparatus is disclosed in JP05-65018A, wherein when an air is heated by means of a heater core by using a cooling water which is used to cool down an engine, a temperature of the heater core is adjusted at around an intended temperature by switchover of a flow path of the cooling water flowing into a heater core by ON/OFF of a valve device with a certain duty ratio.

SUMMARY OF INVENTION

In the technology mentioned above, the flow path is switched over in such a way that when the valve device is ON, the cooling water may flow into the heater core after it is heated up while going through the engine, whereas when the valve device is OFF, the cooling water may not go through the engine so that it may flow into the heater core without being heated up by the engine.

In the air conditioning apparatus as mentioned above, when the state that the cooling water flows into the heater core without going through the engine is switched over to the state that the cooling water heated up by the engine flows into the heater core by means of the valve device, the situation that a temperature difference of the cooling water before and after the switchover of the flow path becomes large can happen. When the temperature difference of the cooling water is large, if the valve device is controlled with the same condition as that of the case that the temperature difference of the cooling water is small, massive amount of the cooling water with the large temperature difference may flow into the heater core whereby increasing the variation of the temperature of the heater core as compared with the case that the temperature difference of the cooling water is small, so that there may be a risk to cause hunting of the air temperature blown out from the air conditioning apparatus.

The present invention was made in order to solve the problem as mentioned above; and therefore, an object of the present invention is to suppress the hunting of the air temperature blown out from the air conditioning apparatus.

One aspect of the present invention is directed to a cooling medium circulating apparatus. The cooling medium circulating apparatus includes a first flow path configured to circulate a cooling medium, a second flow path configured to circulate the cooling medium, a flow path switchover unit configured to connect or disconnect between the first flow path and the second flow path, a first temperature detecting unit configured to detect a temperature of the cooling medium flowing through the first flow path, a second temperature detecting unit configured to detect a temperature of the cooling medium flowing through the second flow path, a temperature difference calculating unit configured to calculate a temperature difference between the temperature of the cooling medium flowing through the first flow path and the temperature of the cooling medium flowing through the second flow path, a flow path switchover time setting unit configured to set a prescribed cycle, a connecting period and a disconnecting period, the connecting period being a period for connecting between the first flow path and the second flow path in the prescribed cycle, the disconnecting period being a period for disconnecting between the first flow path and the second flow path in the prescribed cycle and a controlling unit configured to control the flow path switchover unit on the basis of the connecting period and the disconnecting period which are set by the flow path switchover time setting unit, and wherein the flow path switchover time setting unit is configured to make the prescribed cycle shorter when the temperature difference is larger.

Another aspect of the present invention is directed to a method for controlling a cooling medium circulating apparatus. The cooling medium circulating apparatus includes a first flow path configured to circulate a cooling medium, a second flow path configured to circulate the cooling medium, and a flow path switchover means configured to connect or disconnect between the first flow path and the second flow path. The method includes detecting a temperature of the cooling medium flowing through the first flow path, detecting a temperature of the cooling medium flowing through the second flow path, calculating a temperature difference between the temperature of the cooling medium flowing through the first flow path and the temperature of the cooling medium flowing through the second flow path, setting a prescribed cycle, a connecting period and a disconnecting period, the prescribed cycle being made shorter as the temperature difference is larger, the connecting period being a period for connecting between the first flow path and the second flow path in the prescribed cycle, the disconnecting period being a period for disconnecting between the first flow path and the second flow path in the prescribed cycle, and controlling the flow path switchover means on the basis of the connecting period and the disconnecting period.

Other aspect of the present invention is directed to A cooling medium circulating apparatus includes a first flow path and a second flow path configured to circulate a cooling medium, a connecting flow path configured to connect between the first flow path and the second flow path, a valve device capable of disconnecting a flow of the cooling medium in the connecting flow path, a first temperature sensor arranged in the first flow path, and a second temperature sensor arranged in the second flow path, wherein the valve device is configured to repeatedly connect or disconnect the cooling medium flow in the connecting flow path with a prescribed cycle, and the prescribed cycle is shorter as a temperature difference between a temperature of the cooling medium flowing through the first flow path and a temperature of the cooling medium flowing through the second flow path is larger.

According to these aspects, the prescribed cycle is made shorter as the temperature difference between the temperature of the cooling medium flowing through the first flow path and the temperature of the cooling medium flowing through the second flow path is larger. Thereby, massive flow of the cooling medium with a large temperature difference into the first flow path can be suppressed, so that hunting of the temperature of the cooling medium flowing through the first flow path can be suppressed.

DESCRIPTION OF EMBODIMENTS

Figure 1:
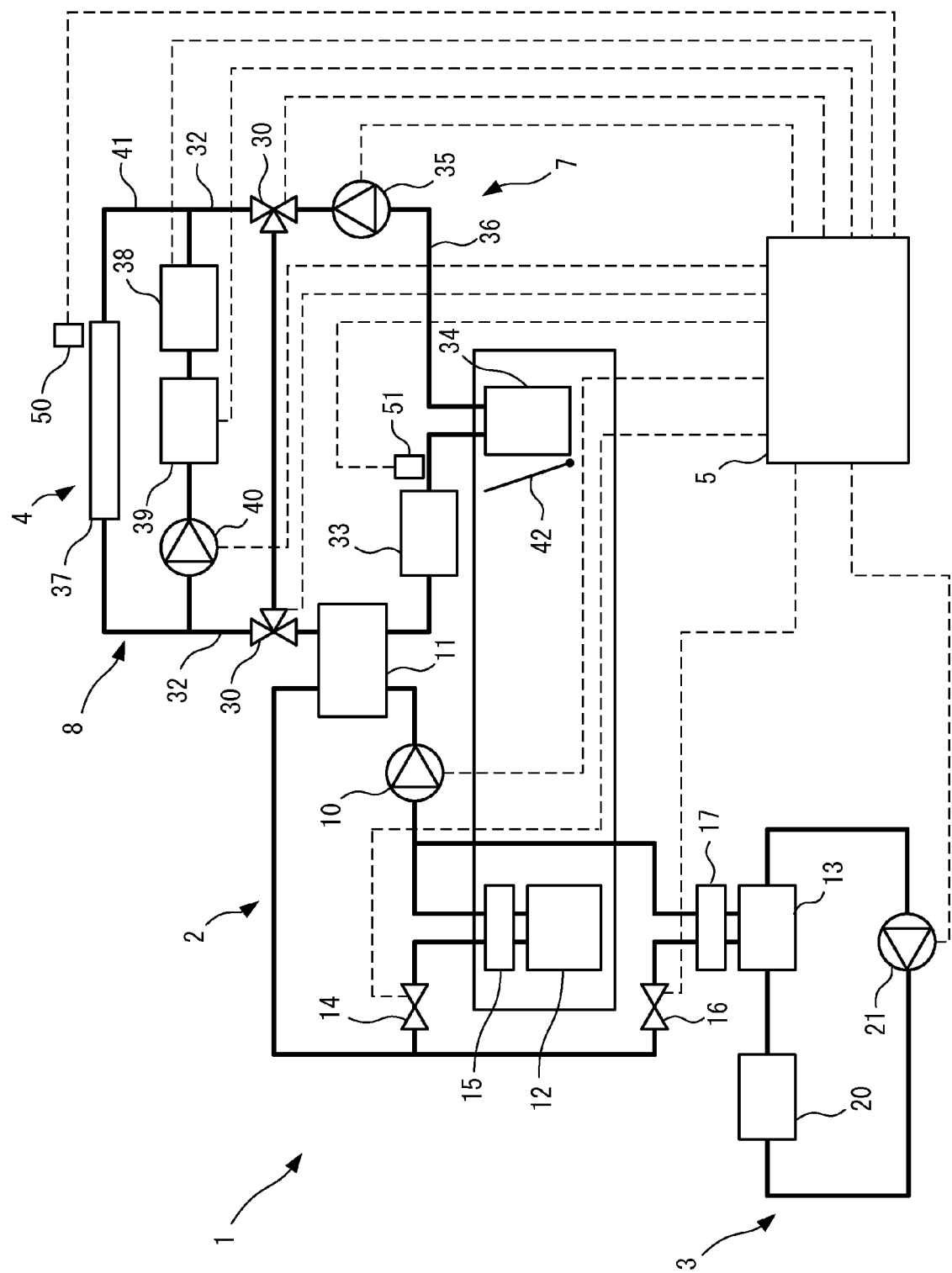
FIG. 1 is a block diagram of a system of an air conditioning apparatus of an electrically driven vehicle in a first embodiment.

Hereunder, the air conditioning apparatus 1 in the first embodiment of the present invention will be explained with referring to the drawings. FIG. 1 is the block diagram of the system of the air conditioning apparatus 1 of an electrically driven vehicle.

The air conditioning apparatus 1 is comprised of the cooling medium cycle 2 through which a cooling medium circulates, the low-temperature water cycle 3 through which a first cooling water circulates, the high-temperature water cycle 4 through which a second cooling water (cooling medium) circulates, and the controller 5. The first cooling water and the second cooling water are composed of for example, a non-freezing solution.

The cooling medium cycle 2 is comprised of the compressor 10, the condenser 11, the evaporator 12, the cooling medium-water heat exchanger 13, the first electromagnetic valve 14, the first expansion valve 15, the second electromagnetic valve 16, and the second expansion valve 17.

The compressor 10 pressurizes the cooling medium to make it a high temperature and high pressure gas. The compressor 10 is driven by the electric power supplied from the battery 20 mentioned later.

The condenser 11 exchanges the heat between the cooling medium pressurized by the compressor 10 and the second cooling water circulating the high-temperature cycle 4 to cool down the cooling medium whereby heating up the second cooling water. By so doing, the cooling medium is liquefied.

The evaporator 12 evaporates the cooling medium which is cooled down by the condenser 11. During the time when the cooling medium is evaporated, an air outside the evaporator 12 is cooled down. The cooling medium which is made to the gas by the evaporator 12 is pressurized again by the compressor 10. The air which is cooled down by the evaporator 12 is used in the air conditioning of the vehicle during a cooling (drying) mode.

The first expansion valve 15 is a temperature-type expansion valve and has a temperature-perceiving cylindrical tube at the exit side of the evaporator 12 (not shown by the drawing), wherein the opening degree thereof is controlled in accordance with the superheat (degree of superheat of the cooling medium) at the exit side of the evaporator 12 in such a way that the cooling medium may be ejected into the evaporator 12 in accordance with the opening degree.

The first electromagnetic valve 14 opens or closes on the basis of the signal from the controller 5.

The cooling medium-water heat exchanger 13 evaporates the cooling medium which is cooled down by the condenser 11 by the heat of the first cooling water. The first cooling water flows inside the cooling medium-water heat exchanger 13, and the first cooling water is cooled down when the cooling medium is evaporated. The cooling medium which becomes a gas by the cooling medium-water heat exchanger 13 is pressurized again by the compressor 10.

The second expansion valve 17 is a temperature-type expansion valve and has a temperature-perceiving cylindrical tube at the exit side of the cooling medium-water heat exchanger 13 (not shown by the drawing); and the opening degree thereof is controlled in accordance with the superheat at the exit side of the cooling medium-water heat exchanger 13 in such a way that the cooling medium may be ejected into the cooling medium-water heat exchanger 13 in accordance with the opening degree.

The second electromagnetic valve 16 opens or closes on the basis of the signal from the controller 5.

The second electromagnetic valve 16, the second expansion valve 17, and the cooling medium-water heat exchanger 13 are arranged in parallel to the first electromagnetic valve 14, the first expansion valve 15, and the evaporator 12.

The low-temperature water cycle 3 is comprised of the battery 20, the cooling medium-water heat exchanger 13, and the first water pump 21.

The first water pump 21 circulates the first cooling water through the battery 20 and the cooling medium-water heat exchanger 13 in this order. The ejection amount of the first water pump 21 is determined on the basis of the signal from the controller 5. Meanwhile, the flow rate of the first water pump 21 may be changed with plural stages in such a way that the flow rate of the first cooling water may be increased as the stage becomes larger.

The battery 20 is the secondary battery to supply the electric power to the motor 38 etc. of the electrically driven vehicle, wherein heat is generated during it is charged and discharged. The battery 20 is cooled down by the first cooling water which is circulating by the first water pump 21.

The first cooling water whose temperature is raised by cooling down the battery 20 flows inside the cooling medium-water heat exchanger 13, and the heat thereof is absorbed when the cooling medium is evaporated by the cooling medium-water heat exchanger 13, so that the temperature thereof is lowered.

The high-temperature water cycle 4 is comprised of the first cycle 7, the second cycle 8, the connecting flow path 32, and the three-way valve 30. The first cycle 7 and the second cycle 8 are connected by the connecting flow path 32, wherein the first cycle 7 and the second cycle 8 become connected or disconnected by switchover of the three-way valve 30.

The first cycle 7 is comprised of the condenser 11, the main heater 33, the heater core 34, the second water pump 35, and the first flow path 36.

The first flow path 36 is made up such that the second cooling water may flow through the second water pump 35, the condenser 11, the main heater 33, and the heater core 34 in this order.

The main heater 33 warms up the second cooling water by the heat generated by the electric power supplied from the battery 20.

The heater core 34 undergoes a heat exchange with the cooling medium by the condenser 11; and thereafter, a heat exchange is made between the second cooling water whose temperature is raised by heating with the main heater 33 and the air around the heater core 34, so that the air may be warmed up. The air which is warmed up by the heater core 34 is used for air conditioning of the cabin during a warming mode. When warming is OFF, the air mix door 42 prohibits the air from hitting the heater core 34, so that warming-up of the air may be prohibited. Meanwhile, a by-pass flow path may be arranged such that the air may by-pass the heater core 34.

The second water pump 35 is driven by the electric power supplied from the battery 20, wherein the rotation speed thereof is constant while it is driven so that the flow rate thereof may be constant. When the first cycle 7 and the second cycle 8 are disconnected by the three-way valve 30, the second water pump 35 circulates the second cooling water through the condenser 11, the main heater 33, and the heater core 34 in this order. When the first cycle 7 and the second cycle 8 are connected by the three-way valve 30, the second water pump 35 lets the second cooling water flow into the radiator 37 to cool down the second cooling water.

The second cycle 8 is comprised of the radiator 37, the motor 38, the inverter 39, the third water pump 40, and the second flow path 41.

The second flow path 41 is made up such that the second cooling water may flow through the third water pump 40, the inverter 39, the motor 38, and the radiator 37 in this order.

The radiator 37 undergoes the heat exchange between the flowing outside air and the second cooling water to cool down the second cooling water.

The inverter 39 transforms between the direct current and the alternate current with each other; and it controls the electric power supplied to the motor 38 from the battery 20 or the electric power supplied to the battery 20 from the motor 38. The inverter 39 is cooled down by the second cooling water.

The motor 38 is the three-phase AC motor which functions as an electric motor by the electric power supplied from the battery 20, and functions as a dynamo during such a time as deceleration of the vehicle. The motor 38 is cooled down by the second cooling water.

The third water pump 40 is driven by the electric power supplied from the battery 20, wherein the rotation speed thereof is constant while it is driven so that the flow rate thereof may be constant while it is driven. When the first cycle 7 and the second cycle 8 are disconnected by the three-way valve 30, the third water pump 40 circulates the second cooling water through the inverter 39, the motor 38, and the radiator 37 in this order. When the first cycle 7 and the second cycle 8 are connected by the three-way valve 30, the third water pump 40 lets the second cooling water flow into the heater core 34.

The three-way valve 30 switches over the flow paths on the basis of a basic cycle, a connecting period, and a disconnecting period, so that the first cycle 7 and the second circle 8 may be connected or disconnected.

The controller 5 is comprised of main memory devices such as CPU and RAM as well as a memory medium memorized with a program which can be read out by a computer. When CPU reads out the program memorized in the memory medium and executes it, each function of the controller 5 is expressed. The memory medium which can be read out by a computer means a magnetic disk, an optical magnetic disk, CD-ROM, DVD-ROM, a semiconductor memory, and the like.

The controller 5 controls the three-way valve 30 on the basis of the signal from the first temperature sensor 50 for detection of the outside temperature and the signal from the second temperature sensor 51 for detection of the temperature of the cooling medium flowing into the heater core 34.

The first temperature sensor 50 is arranged between the front grill and the radiator 37. The second temperature sensor 51 is arranged between the main heater 33 and the heater core 34.

Figure 2:
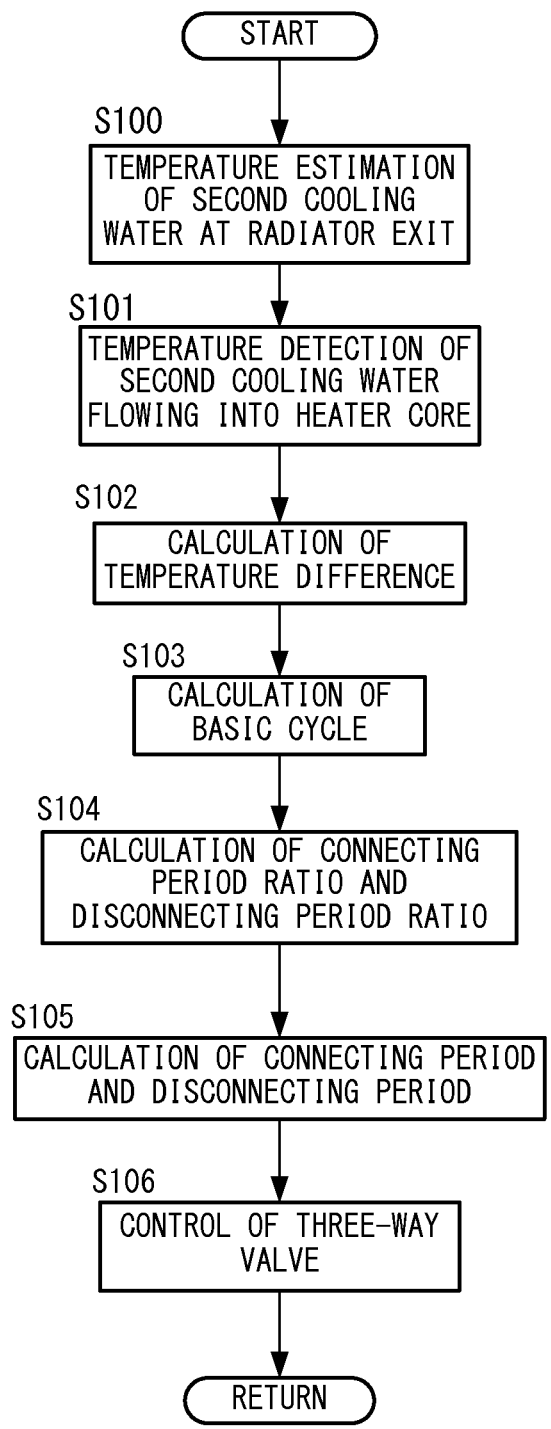
FIG. 2 is a flow chart showing an air control in the first embodiment.

Next, the air control in the first embodiment will be explained by using the flow char of FIG. 2.

In the step S100, the controller 5 detects the outside temperature on the basis of the signal from the first temperature sensor 50 and estimates the temperature of the second cooling water at the exit of the radiator 37 on the basis of the outside temperature.

In the step S101, the controller 5 detects the temperature of the second cooling water flowing into the heater core 34 on the basis of the signal from the second temperature sensor 51.

In the step S102, the controller 5 calculates the deviation between the temperature of the second cooling water flowing into the heater core 34 and the temperature of the second cooling water at the exit of the radiator 37.

Figure 3:
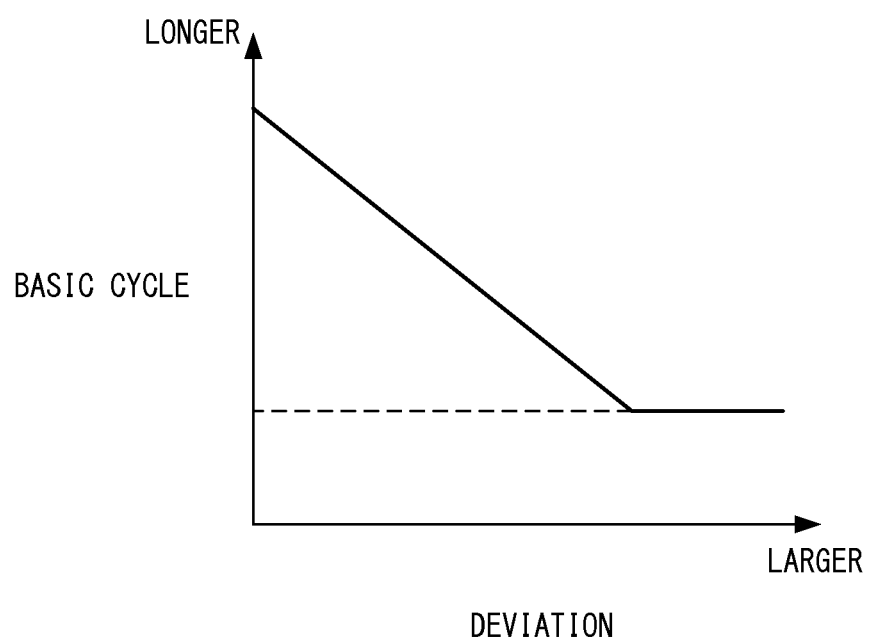
FIG. 3 is a map showing a relationship between a deviation and a basic cycle.

In the step S103, on the basis of the deviation the controller 5 calculates the basic cycle (prescribed cycle) from the map in FIG. 3. FIG. 3 is the map showing the relationship between the deviation and the basic cycle. The basic cycle becomes shorter when the deviation becomes larger; and it becomes the lower limit when the deviation becomes more than a certain prescribed value. The lower limit thereof is set on the basis of the motion guarantee of the three-way valve 30. Meanwhile, this basic cycle means the cycle when the disconnecting motion (disconnection between the first flow path 36 and the second flow path 41) and the connecting motion (connection between the first flow path 36 and the second flow path 41) are repeated in the three-way valve 30.

Figure 4:
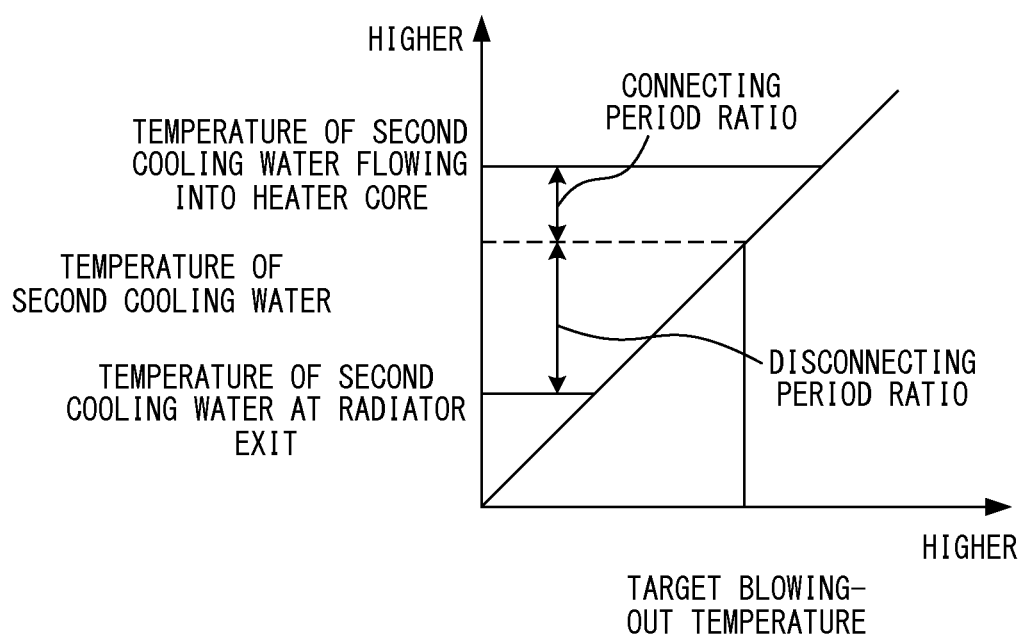
FIG. 4 is a figure showing a relationship among a target blowing-out temperature, a temperature of a second cooling water at an exit of a radiator, a temperature of the second cooling water flowing into a heater core, a connecting period ratio, and a disconnecting period ratio.

In the step S104, the controller 5 calculates the connecting period ratio and the disconnecting period ratio from the map of FIG. 4 on the basis of the temperature of the second cooling water at the exit of the radiator 37, the temperature of the second cooling water flowing into the heater core 34, and the target blowing-out temperature of the air conditioning apparatus 1. FIG. 4 shows the relationship among the target blowing-out temperature, the temperature of the second cooling water at the exit of the radiator 37, the temperature of the second cooling water flowing into the heater core 34, the connecting period ratio, and the disconnecting period ratio. When the temperature of the second cooling water flowing into the heater core 34 is higher than the target blowing-out temperature, as the temperature of the second cooling water flowing into the heater core 34 is getting closer to the target blowing-out temperature, the connecting period ratio becomes lower and the disconnecting period ratio becomes higher. Meanwhile, when the target blowing-out temperature is equal to or lower than the temperature of the second cooling water at the exit of the radiator 37, the disconnecting period ratio becomes zero; and when the target blowing-out temperature is equal to or higher than the temperature of the second cooling water flowing into the heater core 34, the connecting period ratio becomes zero.

In the step S105, the controller 5 calculates the connecting period and the disconnecting period on the basis of the basic cycle, the connecting period ratio, and the disconnecting period ratio. The controller 5 calculates the connecting period and the disconnecting period by portioning out the basic cycle in accordance with the connecting period ratio and the disconnecting period ratio. When the basic cycle becomes longer in a certain connecting period ratio and disconnecting period ratio, each of the connecting period and the disconnecting period becomes longer. When the connecting period ratio becomes higher in a certain basic cycle, the connecting period becomes longer. Specifically, in a certain basic cycle, when the temperature of the second cooling water flowing into the heater core 34 is higher than the target blowing-out temperature, as the temperature of the second cooling water flowing into the heater core 34 is getting closer to the target blowing-out temperature, the connecting period becomes shorter and the disconnecting period becomes longer.

As discussed above, the controller 5 calculates the basic cycle on the basis of the deviation, so that the connecting period and the disconnecting period in this calculated basic cycle may be calculated.

In the step S106, the controller 5 switches over the three-way valve 30 on the basis of the basic cycle, the connecting period, and the disconnecting period. By so doing, in the basic cycle, after the first cycle 7 and the second cycle 8 are connected during the connecting period whereby flowing the second cooling water which is cooled down by the radiator 37 into the heater core 34, the first cycle 7 and the second cycle 8 are disconnected by the three-way valve 30 during the disconnecting period.

The effects of the first embodiment of the present invention will be explained.

As the deviation between the temperature of the second cooling water flowing into the heater core 34 and the temperature of the second cooling water at the exit of the radiator 37 is getting larger, the basic cycle is made shorter. By so doing, when the second cooling water which is cooled down by the radiator 37 flows into the heater core 34, massive flow of the second cooling water which is cooled down by the radiator 37 into the heater core 34 can be suppressed, so that hunting of the blowing-out temperature of the air which is warmed up by the heater core 34 against the target blowing-out temperature can be suppressed. In addition, as the deviation between the temperature of the second cooling water flowing into the heater core 34 and the temperature of the second cooling water at the exit of the radiator 37 is getting smaller, the basic cycle is made longer. By so doing, number of switchover of the three-way valve 30 can be reduced, so that durability of the three-way valve 30 can be enhanced.

When the temperature of the second cooling water flowing into the heater core 34 is higher than the target blowing-out temperature, as the temperature of the second cooling water flowing into the heater core 34 is getting closer to the target blowing-out temperature, the connecting period becomes shorter and the disconnecting period becomes longer. When the temperature of the second cooling water flowing into the heater core 34 comes close to the target blowing temperature, by decreasing the flow rate of the second cooling water flowing into the heater core 34, the second cooling water being cooled down by the radiator 37, the blowing-out temperature of the air which is warmed up by the heater core 34 can be made to come close to the target blowing-out temperature.

By estimating the temperature of the second cooling water at the exit of the radiator 37 on the basis of the signal from the first temperature sensor 50 capable of detecting the outside air temperature, the temperature of the second cooling water at the exit of the radiator 37 can be detected by using an existing temperature sensor without newly installing a temperature sensor.

By detecting the temperature of the second cooling water immediately before flowing into the heater core 34 by using the second temperature sensor 51, the temperature of the heater core 34 can be detected correctly.

Next, the second embodiment of the present invention will be explained with referring to FIG. 5.

Figure 5:
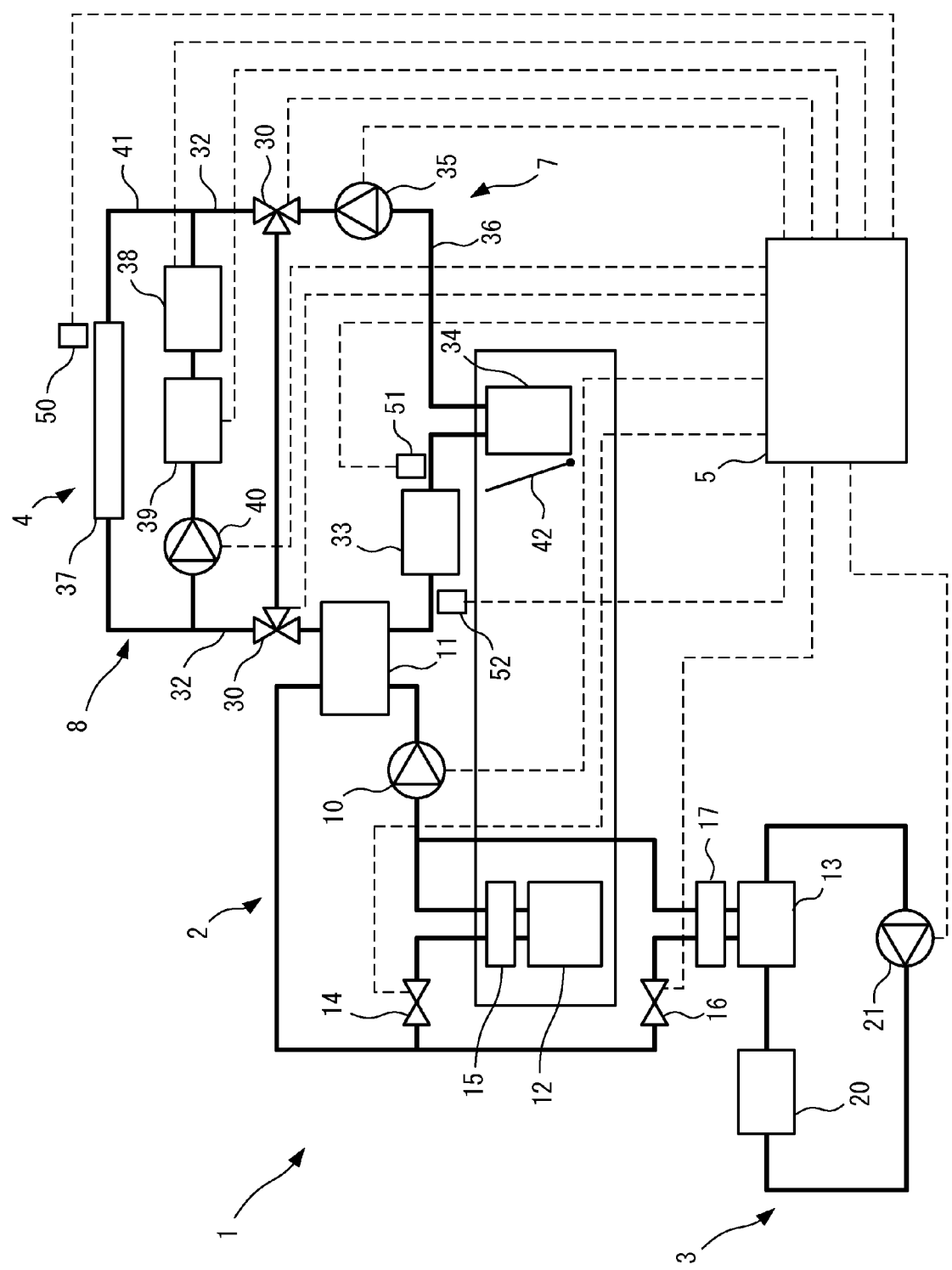
FIG. 5 is a block diagram of a system of an air conditioning apparatus of an electrically driven vehicle in a second embodiment.

FIG. 5 is the block diagram of the system of the air conditioning apparatus 1 of an electrically driven vehicle of the second embodiment. Here, mainly the items different from those of the first embodiment will be explained.

The air conditioning apparatus 1 of the second embodiment is provided with the flow rate sensor 52. The flow rate sensor 52 is installed at the place where detection of the flow rate of the second cooling water flowing into the heater core 34 becomes possible when the first cycle 7 and the second cycle 8 are connected by the three-way valve 30. Specifically, the flow rate sensor 52 is installed between the main heater 33 and the condenser 11.

The controller 5 controls the three-way valve 30 on the basis of the signal from the first temperature sensor 50, the signal from the second temperature sensor 51, and the signal from the flow rate sensor 52.

The third water pump 40 can change the rotation speed thereof in accordance with the load of the motor 38 etc., so that the flow rate of the second cooling water can be changed.

Figure 6:
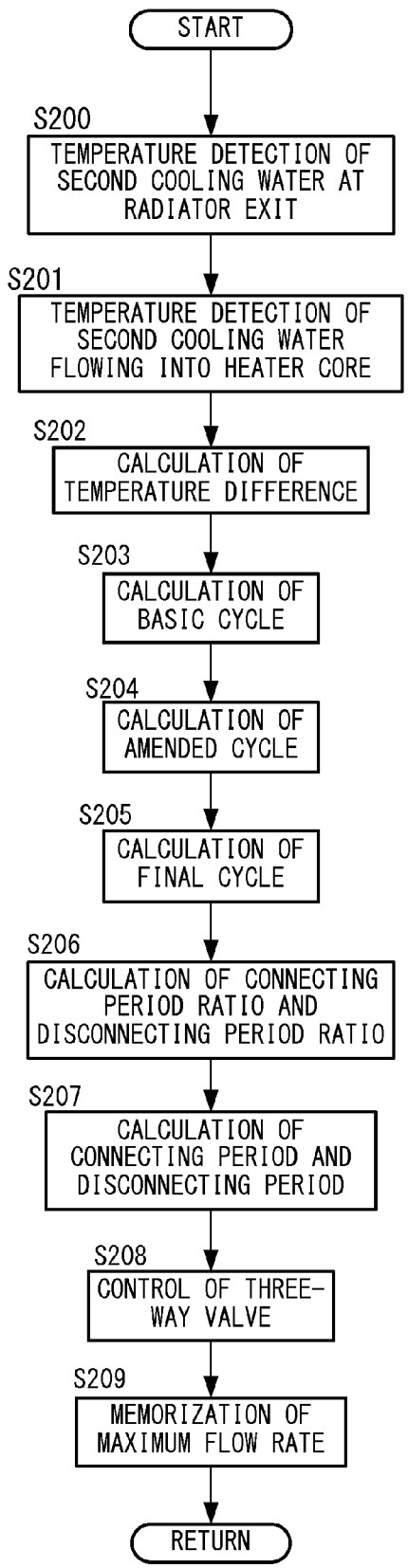
FIG. 6 is a flow chart showing an air control in the second embodiment.

Next, control of the air conditioning in the second embodiment will be explained by using the flow chart shown in FIG. 6.

Controls from the step S200 to the step S203 are the same as the controls from the step S100 to the step S103 in the first embodiment; and therefore, the explanation thereof is omitted here.

Figure 7:
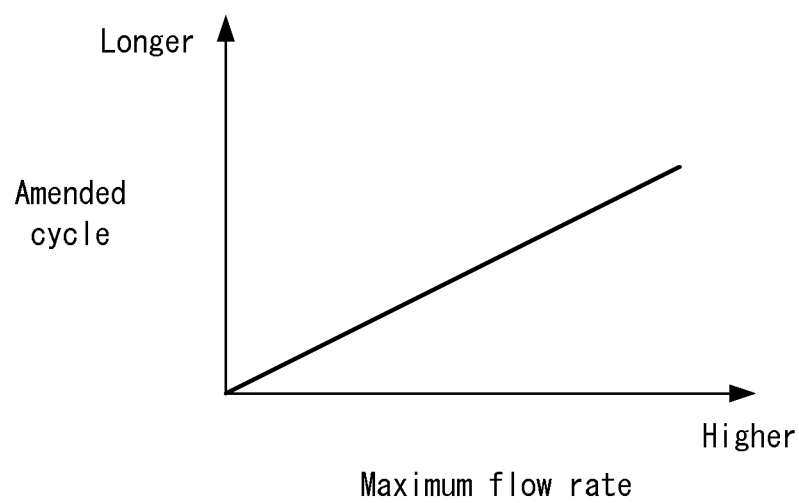
FIG. 7 is a map showing a relationship between a maximum flow rate and an amended cycle.

In the step S204, the controller 5 calculates the amended cycle from the map of FIG. 7 on the basis of the memorized maximum flow rate. The maximum flow rate is the maximum flow rate during the previous control when the first cycle 7 and the second cycle 8 are connected by the three-way valve 30. FIG. 7 is the map showing the relationship between the maximum flow rate and the amended cycle. The amended cycle becomes longer as the maximum flow rate becomes higher.

In the step S205, the controller 5 subtracts the amended cycle from the basic cycle thereby calculating the final cycle (prescribed cycle). The longer the amended cycle is, namely, the higher the maximum flow rate is, the shorter the final cycle becomes. When the first cycle 7 and the second cycle 8 are connected and the flow rate of the second cooling water flowing into the heater core 34 is higher, the time for the second cooling water whose temperature is lowered by the radiator 37 to reach the heater core 34 becomes shorter. Because of this, the temperature change of the heater core 34 becomes larger. Accordingly, the final cycle is made shorter when the maximum flow rate is higher.

In the step S206, the controller 5 calculates the connecting period ratio and the disconnecting period ratio from the map of FIG. 4 on the basis of the temperature of the second cooling water at the exit of the radiator 37, the temperature of the second cooling water flowing into the heater core 34, and the target blowing-out temperature.

In the step S207, the controller 5 calculates the connecting period and the disconnecting period on the basis of the final cycle, the connecting period ratio, and the disconnecting period ratio.

In the step S208, the controller 5 switches over the three-way valve 30 on the basis of the final cycle, the connecting period, and the disconnecting period.

In the step S209, in the case that the first cycle 7 and the second cycle 8 are connected by the three-way valve 30, the controller 5 detects the flow rate of the second cooling water flowing into the heater core 34 on the basis of the signal from the flow rate sensor 52 and memorizes the maximum flow rate. This memorized maximum flow rate is used in the next control. Meanwhile, when the maximum flow rate is newly calculated, the memorized maximum flow rate is deleted.

Next, the effects of the second embodiment will be explained.

In the case that the first cycle 7 and the second cycle 8 are connected, the higher the maximum flow rate of the second cooling water flowing into the heater core 34 is, the shorter the final cycle is made. By so doing, the flow rate of the second cooling water cooled down by the radiator 37 during the final cycle and flowing into the heater core 34 can be made lower; and as a result, the hunting of the blowing-out temperature of the air against the target blowing-out temperature can be suppressed. Especially, lowering of the blowing-out temperature of the air against the target blowing-out temperature can be suppressed.

The embodiments of the present invention has been explained in the above, wherein the above-mentioned embodiments show merely a part of the application examples of the present invention; and therefore, this does not mean that the technical scope of the present invention is limited to the specific composition of these embodiments.

In the second embodiment, the amended cycle is calculated by using the maximum flow rate when the first cycle 7 and the second cycle 8 were connected by the three-way valve 30 in the previous control; however, the amended cycle may be calculated by estimating the flow rate of the third water pump 40 from the load of the motor 38 and so forth whereby estimating the maximum flow rate when the first cycle 7 and the second cycle 8 are connected by the three-way valve 30.

In the second embodiment, the flow rate of the third water pump 40 was made variable; however, the flow rate of the second water pump 35 may be made variable, or the flow rate of the second water pump 35 as well as the flow rate of the third water pump 40 may be made variable.

In the second embodiment, the amended cycle was calculated on the basis of the maximum flow rate; however, by calculating the average flow rate, the amended cycle may be calculated on the basis of this average flow rate.

There may be a difference in the flow rate of the second cooling water depending on the type of the vehicles. In this case, the basic cycle of the air conditioning apparatus for the basic electrically driven vehicle is established; and then, in the case that the flow rate of the second cooling water is different from that of the basic air conditioning apparatus, the amended cycle for each air conditioning apparatus may be established by the way used in the second embodiment, whereby the final cycle suitable for each air conditioning apparatus may be set.

In the above-mentioned embodiments, the air conditioning apparatus 1 of an electrically driven vehicle has been explained; however, this may be applied to the air conditioning apparatus of a hybrid vehicle as well.

In the above-mentioned embodiments, explanation has been made by using the three-way valve 30; however, two control valves in place of one three-way valve 30 may be used, wherein the first cycle 7 and the second cycle 8 may be connected and disconnected by controlling these two control valves.

In the above-mentioned embodiments, the temperature of the second cooling water at the exit of the radiator 37 was estimated from the outside air temperature; however, the temperature of the second cooling water at the exit of the radiator 37 may be detected by a temperature sensor.

In the above-mentioned embodiments, the cooling medium cycle 2, the low-temperature water cycle 3, and the high-temperature water cycle 4 were controlled by one controller 5; however, different controllers may be used for these controls.

In the low-temperature water cycle 3, not limiting to the first cooling water, any cooling medium regardless of a liquid and a gaseous medium may be used. In addition, in the high-temperature water cycle 4, not limiting to the second cooling water, a liquid and a gaseous medium may be used.

This application claims priority from Japanese Patent Application No. 2013-7787, filed Jan. 18, 2013, which is incorporated herein by reference in its entirety.

The invention claimed is:

1. A cooling medium circulating apparatus, comprising:
a first flow path configured to circulate a cooling medium,
a second flow path configured to circulate the cooling medium,
a flow path switchover unit configured to connect or disconnect between the first flow path and the second flow path,
a first temperature detecting unit configured to detect a temperature of the cooling medium flowing through the first flow path,
a second temperature detecting unit configured to detect a temperature of the cooling medium flowing through the second flow path,
a temperature difference calculating unit configured to calculate a temperature difference between the temperature of the cooling medium flowing through the first flow path and the temperature of the cooling medium flowing through the second flow path,
a flow path switchover time setting unit configured to set a prescribed cycle, a connecting period and a disconnecting period, the connecting period being a period for connecting between the first flow path and the second flow path in the prescribed cycle, the disconnecting period being a period for disconnecting between the first flow path and the second flow path in the prescribed cycle, and
a controlling unit configured to control the flow path switchover unit on the basis of the connecting period and the disconnecting period which are set by the flow path switchover time setting unit, and wherein
the flow path switchover time setting unit is configured to make the prescribed cycle shorter as the temperature difference becomes larger.

2. The cooling medium circulating apparatus according to claim 1, wherein
when the temperature of the cooling medium flowing through the first flow path is higher than a target temperature, as the temperature of the cooling medium flowing through the first flow path is getting closer to the target temperature, the flow path switchover time setting unit is configured to make the connecting period shorter and the disconnecting period longer.

3. The cooling medium circulating apparatus according to claim 1, further comprising:
a flow rate detecting unit configured to detect a flow rate of the cooling medium flowing through the first flow path when the first flow path and the second flow path are connected, wherein
the flow path switchover time setting unit is configured to make the prescribed cycle shorter as the flow rate detected by the flow rate detecting unit is getting higher.

4. An air conditioning apparatus for a vehicle, wherein the air conditioning apparatus for a vehicle is provided with the cooling medium circulating apparatus according to claim 1, comprising:
- a freezing cycle having a condenser configured to heat up the cooling medium by heat-exchange with the cooling medium flowing through the first flow path, wherein
- the cooling medium circulating apparatus is provided with a heater core configured to heat up air by the cooling medium which is heated up by the condenser.

5. The air conditioning apparatus for a vehicle according to claim 4, wherein
- the first temperature detecting unit is configured to detect a temperature of the cooling medium flowing into the heater core.

6. The air conditioning apparatus for a vehicle according to claim 4, further comprising:
- a cooling unit configured to cool down the cooling medium by outside air in the second flow path, wherein
- the second temperature detecting unit is configured to detect a temperature of the outside air and detect a temperature of the cooling medium in the second flow path on the basis of the temperature of the outside air.

7. A method for controlling a cooling medium circulating apparatus, the cooling medium circulating apparatus comprising:
- a first flow path configured to circulate a cooling medium,
- a second flow path configured to circulate the cooling medium, and
- a flow path switchover unit configured to connect or disconnect between the first flow path and the second flow path, the method comprising:
- detecting a temperature of the cooling medium flowing through the first flow path,
- detecting a temperature of the cooling medium flowing through the second flow path,
- calculating a temperature difference between the temperature of the cooling medium flowing through the first flow path and the temperature of the cooling medium flowing through the second flow path,
- setting a prescribed cycle, a connecting period and a disconnecting period, the prescribed cycle being made shorter as the temperature difference becomes larger, the connecting period being a period for connecting between the first flow path and the second flow path in the prescribed cycle, the disconnecting period being a period for disconnecting between the first flow path and the second flow path in the prescribed cycle, and
- controlling the flow path switchover unit on the basis of the connecting period and the disconnecting period.

8. A cooling medium circulating apparatus comprising:
- a first flow path and a second flow path configured to circulate a cooling medium,
- a connecting flow path configured to connect between the first flow path and the second flow path,
- a valve device capable of disconnecting a flow of the cooling medium in the connecting flow path,
- a first temperature sensor arranged in the first flow path, and
- a second temperature sensor arranged in the second flow path, wherein
- the valve device is configured to repeatedly connect or disconnect the cooling medium flow in the connecting flow path in a prescribed cycle, and
- the prescribed cycle is shorter as a temperature difference between a temperature of the cooling medium flowing through the first flow path and a temperature of the cooling medium flowing through the second flow path is larger.

* * * * *